United States Patent
Kisch et al.

(10) Patent No.: US 7,472,736 B2
(45) Date of Patent: Jan. 6, 2009

(54) MODULAR HEAD LAMINATION DEVICE AND METHOD

(75) Inventors: Robert A. Kisch, Auburn, WA (US); Robert A. Kramp, Sumner, WA (US); Matthew K. Lum, Mercer Island, WA (US); Robert R. Wampler, Augusta, KS (US)

(73) Assignee: The Boeing Company, Chicago, IL (US)

( * ) Notice: Subject to any disclaimer, the term of this patent is extended or adjusted under 35 U.S.C. 154(b) by 405 days.

(21) Appl. No.: 11/055,975

(22) Filed: Feb. 14, 2005

(65) Prior Publication Data

US 2006/0180264 A1 Aug. 17, 2006

(51) Int. Cl.
*B32B 37/00* (2006.01)
*B65H 81/00* (2006.01)
(52) U.S. Cl. .................. 156/433; 156/441; 156/425; 156/523; 156/574
(58) Field of Classification Search ............. 156/166, 156/173, 175, 433, 441, 425, 523, 574
See application file for complete search history.

(56) References Cited

U.S. PATENT DOCUMENTS

| | | | | |
|---|---|---|---|---|
| 4,699,683 A | * | 10/1987 | McCowin | 156/353 |
| 4,750,960 A | * | 6/1988 | Bubeck | 156/169 |
| 4,867,834 A | * | 9/1989 | Alenskis et al. | 156/433 |
| 4,909,880 A | | 3/1990 | Kittelson et al. | |
| 4,943,338 A | | 7/1990 | Wisbey | 156/433 |
| 5,022,952 A | | 6/1991 | Vaniglia | 156/441 |
| 5,032,016 A | * | 7/1991 | Youngkeit | 359/853 |
| 5,110,395 A | | 5/1992 | Vaniglia | 156/353 |
| 5,290,389 A | * | 3/1994 | Shupe et al. | 156/425 |
| 5,454,897 A | | 10/1995 | Vaniglia | 156/166 |
| 5,560,942 A | * | 10/1996 | Curry | 425/363 |
| 6,026,883 A | | 2/2000 | Hegerhorst et al. | 156/441 |
| 6,050,315 A | | 4/2000 | Deckers et al. | 156/433 |
| 6,096,164 A | | 8/2000 | Benson et al. | 156/425 |
| 6,112,792 A | | 9/2000 | Barr et al. | 156/441 |
| 6,491,773 B1 | | 12/2002 | Miller et al. | 156/64 |
| 2002/0124967 A1 | * | 9/2002 | Sharp | 156/378 |
| 2003/0171447 A1 | * | 9/2003 | Torres Martinez | 522/75 |
| 2006/0090856 A1 | | 5/2006 | Nelson et al. | |

FOREIGN PATENT DOCUMENTS

| | | | |
|---|---|---|---|
| EP | 493739 A1 | * | 7/1992 |
| EP | 1 342 555 B1 | | 5/2006 |
| EP | 1342555 B1 | | 5/2006 |
| FR | 2579130 A1 | * | 9/1986 |

OTHER PUBLICATIONS

Ermert, W., et al "R U Reinforcing plastics with robots?", Plastics Engineering, May 1981, pp. 37-46.*

* cited by examiner

*Primary Examiner*—Jeff H Aftergut
(74) *Attorney, Agent, or Firm*—Baker & Hostetler LLP

(57) ABSTRACT

A composite item is fabricated with a device. The device includes and end effector and a positioning device. The end effector places a tow. The end effector includes a spindle, compaction device, and a path. The spindle detachably secures a spool of tow and the path is disposed from the spool to the compaction device. The positioning device positions the end effector. The end effector is detachably secured to the positioning device.

22 Claims, 5 Drawing Sheets

MODULAR HEAD LAMINATION DEVICE AND METHOD

FIELD OF THE INVENTION

The present invention generally relates to a lamination device. More particularly, the present invention pertains to a system and device for, and method of, fabricating a composite item.

BACKGROUND OF THE INVENTION

Composite items are typically constructed from layers of material that are laminated together. The categories of materials utilized to fabricate or 'layup' composite items includes, for example: fiber; fabric; tape; film; and foil. Within each of these categories, a multitude of diverse materials are utilized. For example, fibers utilized includes: glass; carbon; aramid; quartz; and the like. When these fibers are arranged as woven sheets and unidirectional ribbons, they are referred to as fabric and tape, respectively.

Fiber placement is a process used to construct or fabricate composite items. These composite items include relatively simple planar sheets or panels to relatively large complex structures. The composite items are generally built up from multiple layers or plies of composite materials that are pre-impregnated with uncured resin ("prepreg").

A head on a seven-axis manipulator arrays a group of prepreg tows into a continuous band and compacts them against the surface of a form or layup tool. Fiber placement combines the advantages of both filament winding and automated tape lamination while avoiding the disadvantages of each. Conventional fiber placement machines have a large refrigerated creel house used to store the composite prepreg material, or tow. This creel house is normally separated from the head and takes up to an hour to rethread tows from the creel to the head when changing the material or the head. In addition, resin often builds up on or around components that carry the tow from the creel to the head and can cause downtime in production.

Accordingly, it is desirable to provide a method and apparatus capable of overcoming the disadvantages described herein at least to some extent.

SUMMARY OF THE INVENTION

The foregoing needs are met, to a great extent, by the present invention, wherein in one respect a device, system and method is provided that in some embodiments places tow on a substrate with a modular head with integrated creel.

An embodiment of the present invention relates to a device to fabricate a composite item. The device includes an end effector and a positioning device. The end effector places a tow. The end effector includes a spindle, a tow path, and a compaction device. The spindle detachably secures a spool of tow and the path is disposed from the spool to the compaction device. The positioning device positions the end effector. The end effector is detachably secured to the positioning device.

Another embodiment of the present invention pertains to a system to fabricate a composite item. The system includes a tool, end effector, and positioning device. The tool includes a mandrel and a headstock. A tow is applied to the mandrel. The headstock rotates the mandrel about an axis. The end effector places the tow. The end effector includes a spindle, compaction device, and a path. The spindle detachably secures a spool of tow. The compaction device presses the tow upon the mandrel. The path is disposed from the spool to the compaction device. The positioning device operates cooperatively with the headstock to position the end effector relative to the tool and the end effector is detachably secured to the positioning device.

The laminating device 10 is configured to fabricate an item 16 by applying a course material 18 on a form 20. Typically, the item 16 is fabricated from multiple plies or layers of the course material 18. In various forms, the end effector 14 includes a compaction roller 22 and/or sweep to apply the course material 18 to the form 20. The form 20 is configured to provide a suitably stable and finished surface for ply placement. As shown in FIG. 1, the form 20 is controlled to rotate about an axis. When controlled to rotate thusly, the form 20 is typically referred to as a mandrel. In other embodiments, the form 20 may be stationary or controlled to move in various axes. For example, the form 20 may be secured to a sliding table or X-Y table. In this regard, these and other embodiments in which the form 20 and/or the end effector 14 are controlled to move, one relative to the other, are within the scope of the invention. Additionally, the movement of the form 20 and the positioning device 12 both act to position the end effector 14. Furthermore, the movement of the form 20 and the positioning device 12 is generally coordinated to such a degree that the devices operate essentially as a single unit and thus, for the purpose of this disclosure, modulation of the positioning device 12 and/or the form 20 will be referred to with respect to the positioning device 12. Characteristics of the form 20, such as size, shape, contour, and the like, are based upon design parameters of an item 16. The item 16 is shown in FIG. 1 being constructed from a plurality of courses 24. Each layer of the courses 24 that is placed upon the form 20 or a substrate 26 is described as a ply and the item 16 is typically fabricated from a plurality of plies. The substrate 26 includes the form 20 surface and/or a previously applied course 24.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

Figure 1:
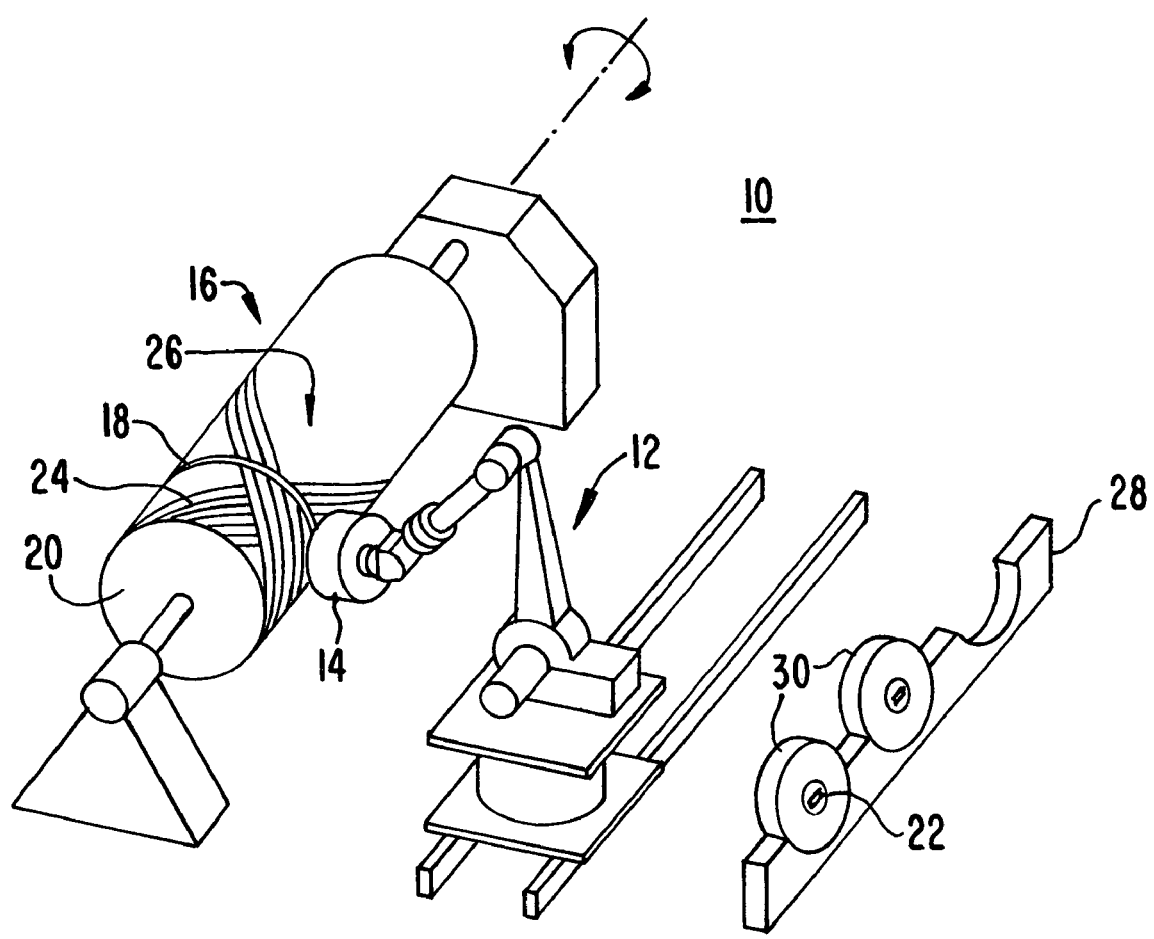
FIG. 1 is a perspective view of an automated lamination device according to an embodiment of the invention.

The invention will now be described with reference to the drawing figures, in which like reference numerals refer to like parts throughout. As shown in FIG. 1, a laminating device 10 suitable for use in an embodiment of the invention includes a positioning device 12 and an end effector 14. The positioning device 12 is configured to position or otherwise control the movement of the end effector 14. In an embodiment of the invention, the positioning device 12 is a robotic armature or gantry-type positioning device configured to control three to ten or more axes of movement. However, it is to be understood that the specific number of axes may depend upon the particular operating condition and thus, the number of axes controlled is not critical to the invention.

The laminating device 12 is configured to fabricate an item 16 by applying a course material 18 on a form 20. Typically, the item 16 is fabricated from multiple plies or layers of the course material 18. In various forms, the end effector 14 includes a compaction roller 22 and/or sweep to apply the course material 18 to the form 20. The form 20 is configured to provide a suitably stable and finished surface for ply placement. As shown in FIG. 1, the form 20 is controlled to rotate about an axis. When controlled to rotate thusly, the form 20 is typically referred to as a mandrel. In other embodiments, the form 20 may be stationary or controlled to move in various axes. For example, the form 20 may be secured to a sliding table or X-Y table. In this regard, these and other embodiments in which the form 20 and/or the end effector 14 are controlled to move, one relative to the other, are within the scope of the invention. Additionally, the movement of the form 20 and the positioning device 12 both act to position the end effector 14. Furthermore, the movement of the form 20 and the positioning device 12 is generally coordinated to such a degree that the devices operate essentially as a single unit and thus, for the purpose of this disclosure, modulation of the positioning device 12 and/or the form 20 will be referred to with respect to the positioning device 12. Characteristics of the form 20, such as size, shape, contour, and the like, are based upon design parameters of an item 16. The item 16 is shown in FIG. 1 being constructed from a plurality of courses 24. Each layer of the courses 24 that is placed upon the form 20 or a substrate 26 is described as a ply and the item 16 is typically fabricated from a plurality of plies. The substrate 26 includes the form 20 surface and/or a previously applied course 24.

According to an embodiment illustrated in FIG. 1, the laminating device 10 further includes an off-line station 28 configured to retain a set of off-line end effectors 30. The off-line end effectors 30 are each operable to be interchanged with the end effector 14 via a controllable quick release coupling. It is an advantage of various embodiments of the invention, that the set of off-line end effectors 30 facilitate greatly increased productivity. That is, in the event that a servicing operation is to be performed upon the end effector 14, the end effector 14 is disposed upon the off-line station 28 and taken 'off-line' by disconnecting from the positioning device 12. The positioning device 12 then connects to an off-line end effector 30 and the laminating device continues to fabricate the item 16.

Figure 2:
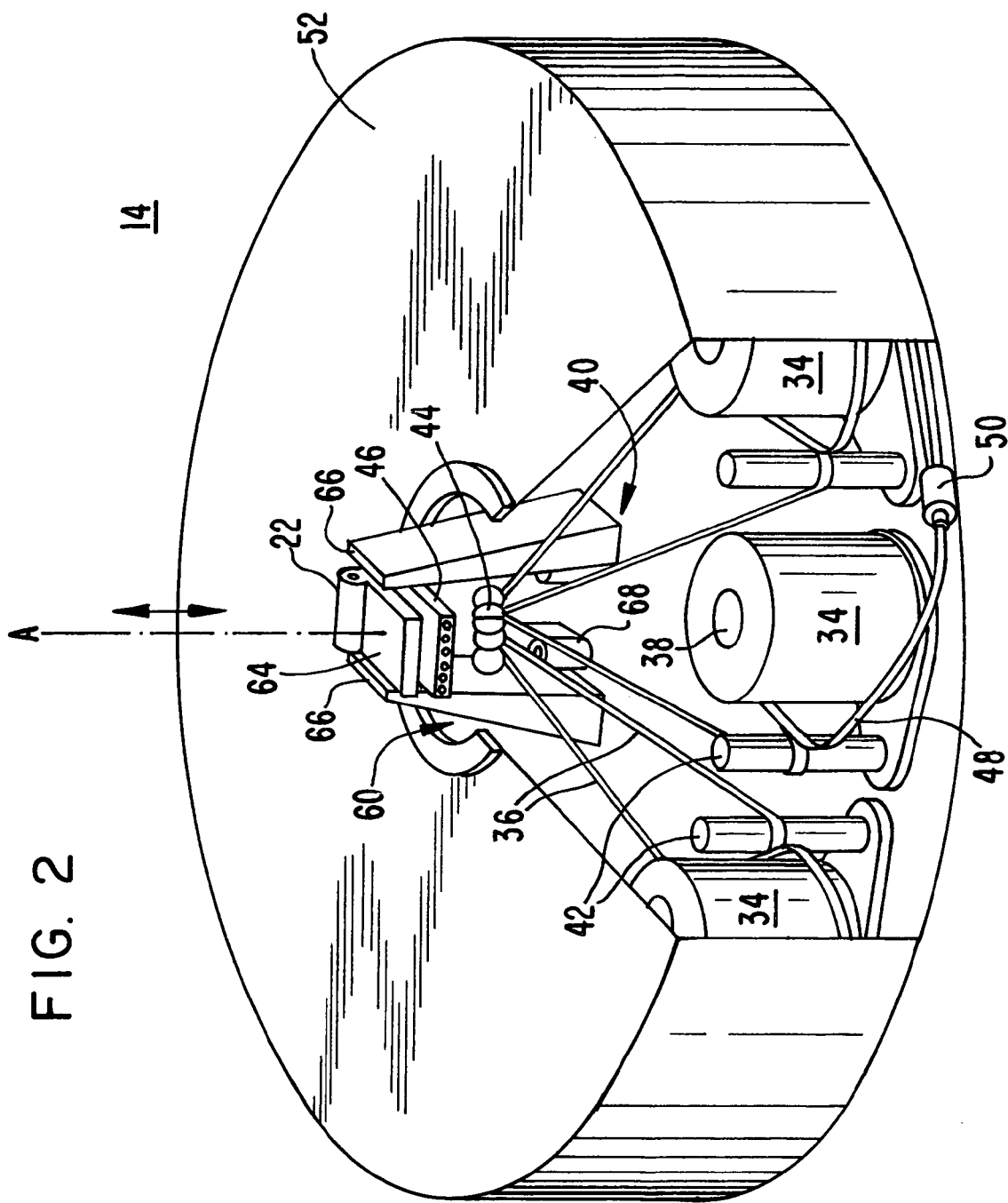
FIG. 2 is a perspective view of a front of an end effector that is suitable for use with the laminating device of FIG. 1.

FIG. 2 is a perspective view of a front of the end effector 14 that is suitable for use with the laminating device 10. As shown in FIG. 2, the end effector 14 includes a set of spools 34 to dispense a tow 36. The tow 36 includes any suitable course material. Examples of suitable course material include various fibers, films, foils, and/or the like. Particular examples of fibers include glass, aramid, carbon, and various other fibers. The tow 36 includes individual fibers, bundles, cords, plaits, ribbons in the form of unidirectional "tape," woven fabric, biaxial cloth and the like. In addition, the tow 36 may be pre-impregnated with a resin or other such binding substance. To continue, each of the spools 34 is mounted on a respective spindle or tensioner 38. The tensioner 38 detachably secures the respective spool 34 to the end effector 14 and includes any suitable tensioning device such as, for example, a brake or motor to tension and otherwise modulate the rate at which the tow 36 is dispensed. A specific example of a suitable tensioning device includes a belt that wraps around a portion of the circumference of the tensioner 38 and generates friction that retards the rotation of the tensioner 38. The friction is modulated via the action of a solenoid or servo acting upon the belt. In conventional fiber placement systems, the end effector may move over a meter relative to the creel and, as such, the tensioners must take up this slack. In contrast, as embodiments of the present invention include the creel in the end effector 14, there is little or no slack to take up. Thus, it is an advantage of various embodiments of the invention that tensioner 38 may utilize a relatively simple, inexpensive, and reliable tensioning device as compared to tensioning devices required by conventional fiber placement systems.

The end effector 14 further includes a path 40 for the tow 36 to follow as it travels from the spool 34 to a compaction roller 22. The path 40 includes a dancer roller 42 that dampens rapid changes in tow feed rates. The path 40 further includes a redirecting pulley 44 to guide the tow 36 into a cutting assembly 46. According to an embodiment, the dancer roller 42 and the redirecting pulley 44 are essentially fixed in angle relative to one another. Thus, the angle at which the tow 36 is introduced to the redirecting pulley 44 remains substantially constant even as the radius of the spool 34 decreases due to removal of the tow 36. The dancer roller 42 further facilitates a smooth removal of the tow 36 from the spool 34 and may further facilitate removal of an optional tow backing 48, if present. The tow backing 48 or separator film, if present, substantially prevents the tow 36 from adhering to itself while it is on the spool 34 or in roll form. To remove the tow backing 48, the end effector 14 optionally includes a backing removal system. The backing removal system includes any suitable system operable to draw off the tow backing 48 from the tow 36. Suitable backing removal systems include take up spools or reels and the like. In a particular embodiment, the end effector 14 includes a vacuum nozzle 50 in fluid communication with a vacuum source and configured to generate sufficient suction to draw off the tow backing 48.

From the redirecting pulley 44, the tow 36 is directed further along the path 40 and past a series of optional components such as, for example, combs, cutting assemblies, clamps, dancers, idlers and the like. Thereafter, the tow 36 is directed to the compaction roller 22.

Depending upon material characteristics of the tow 36, it may be advantageous to modulate environmental variable such as, for example, temperature, humidity, and the like. In addition, based on manufacturers specifications and/or empirically derived date, the storage and/or application conditions may differ. In this regard, the end effector 14 optionally includes a housing 52, environmental controller 56 (shown in FIG. 3), heater 62 (shown in FIG. 3) and chiller 58 (shown in FIG. 3). As shown in FIG. 2, the housing 52 encloses the set of spools 34 and thus, facilitates control over the environment in which the tow 36 resides by substantially retaining and/or directing flow of air supplied by the environmental control assembly 58. The housing 52 includes an opening 60 for the compaction roller 22 to address the form 20. In various embodiments, the housing is opaque, transparent, or at least partially transparent. For example, to facilitate visual inspection of the set of spools 34 and other components of the end effector 14, the housing 52 includes a translucent or substantially transparent material such as, acrylic, polycarbonate, polyethylene, lexan®, Plexiglas®, and the like.

According to an embodiment of the invention, the compaction roller 22 is optionally configured to move along an axis "A" relative to the end effector. The axis A is generally referred to as the compliance axis and allows the lamination device 10 to accommodate a slight (±1 to 20 mm) misalignment of the form 20 and/or unanticipated tow buildup on the form 20. In this regard, a compaction roller subassembly 64 is slidably secured to a pair of brackets 66. The compaction roller subassembly 64 is urged toward the form 20 via the action of one or more pneumatic cylinders 68.

Figure 3:
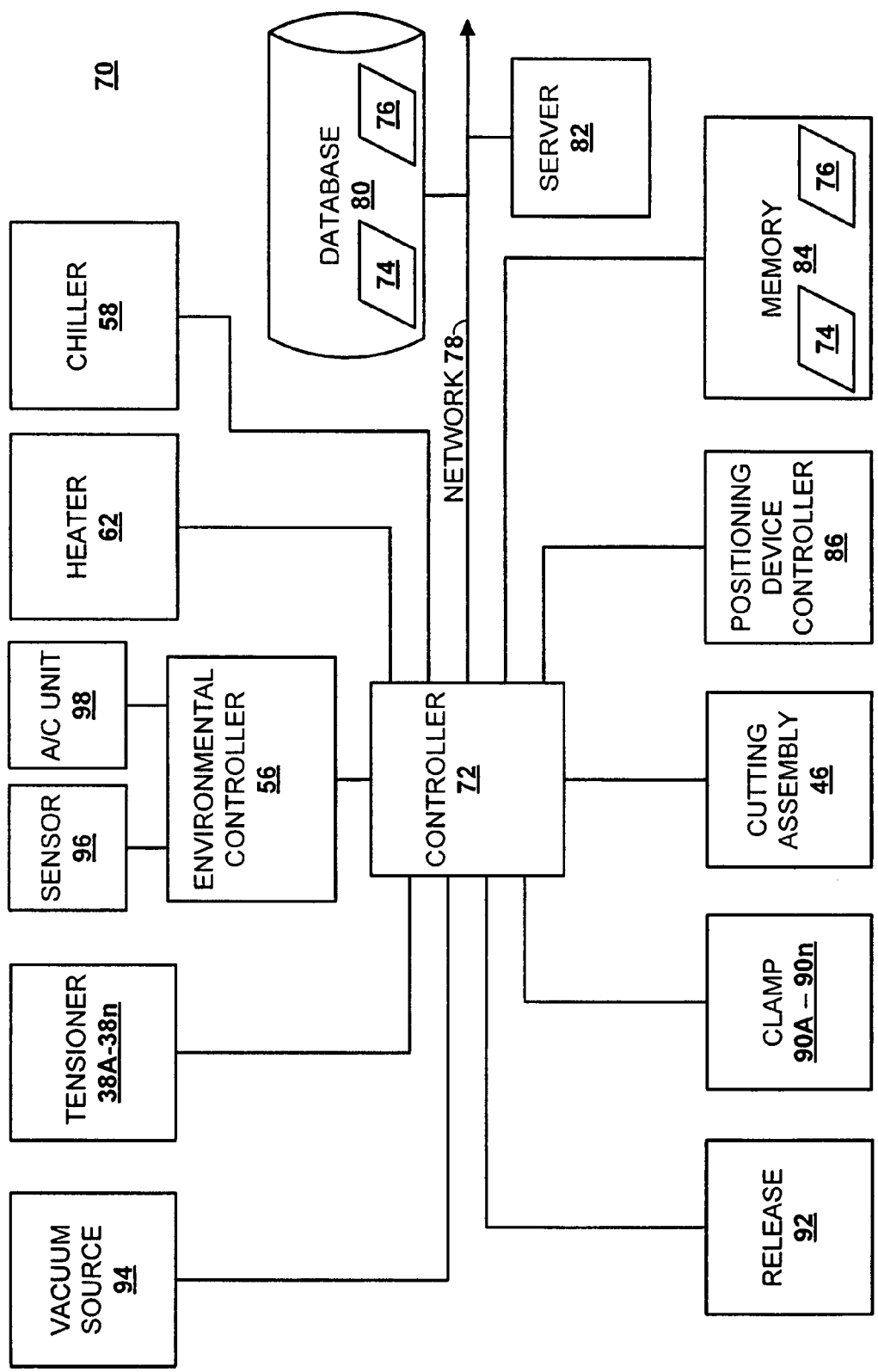
FIG. 3 is a block diagram of a system suitable for use with the laminating device of FIG. 1.

FIG. 3 is a block diagram of a system 70 suitable for use with the laminating device 10. As shown in FIG. 3, the system 70 includes a controller 72. The controller 72 is operable to execute computer readable code. In this regard, the system 70 includes a set of computer readable instructions or code 74. According to the code 74, the controller 72 is configured to access a file 76. This file 76 includes one or more of the following: a computer readable model of the composite item 16; a computer readable representation of the surface of the layup form or the form 20; a computer readable representation of the edges of the form 20; the thickness of the composite item 16; a source code based upon at least one of the composite item 16 and the form 20; a set of movement instructions based upon the source code; data gathered while laying up the composite item 16; timestamp information; positional information; identification numbers; and the like. The controller 72 is further configured to communicate across a network 78. The network 78 is optionally included to provide additional data storage and/or processing capabilities. In this regard, the network includes a database 80 and a server 82. The database 80 is configured to store a copy of the code 74 and/or file 76. The server 82 is configured to generate, store, and perform any suitable processing of the code 74 and/or file 76. In this manner, composite items, such as the composite item 16, generated on computer aided design (CAD) machines such as the server 82, for example, may be forwarded to the laminating device 10. In addition, the server 82 is operable, via the network 78, to forward updates for the code 74 and/or file 76. In addition, the system 70 optionally includes a memory 84. If present, the memory 84 is configured to store a copy of the code 74 and/or file 76.

Also shown in FIG. 3 is a positioning device controller 86. The positioning device controller 86 is optionally included in the system 70 depending upon the requirements of the various actuators and/or servo motors of the laminating device 10. That is, depending upon the particular configuration of the laminating device 10, a plurality of actuators and/or servo motors modulate the rotation, position, speed, direction, and the like of the various components of the laminating device 10. More particularly, these actuators and/or servo motors of the positioning device 12 are at least configured to modulate the various axes of the end effector 14 and/or laminating device 10. If present, parameters of the positioning device controller 86 are based upon the specification of the various actuators, servos, and/or the controller 72. The positioning device controller 86, if present, is configured to control some or all of these actuators and/or servo motors. In addition, these actuators and/or servo motors are optionally operable to be modulated by the controller 72 directly, and thus, the system 70 may omit the positioning device controller 86.

In addition, the controller 72 is configured to modulate the plurality of tensioners 38. For example, depending upon the speed, direction of travel, turning radius, and the like, the controller 72 is configured to individually control an amount of resistance each tensioner 38 offers. In this manner, each tow 36 is controlled. Similarly, the controller 72 is configured to control the cutting assembly 46 and a set of clamps 90A to 90n. In this regard, the end effector 14 generally includes a cutter and a clamp 90A to 90n for each tow 36. The controller 72 is configured to control the cutting assembly 46 and clamps 90A to 90n such that individual tows may be added or removed from the course 24 as appropriate.

The controller 72 is further configured to control a release 92. The release 92 secures the end effector 14 to the positioning device 12 in a controllable and releasable manner. For example, release 92 includes any suitable actuator operable to exert a force upon a bearing surface such as a locking pin or the like. In this manner, the controller 72 is operable to quickly and automatically detach from the end effector 14 and re-attach to one of the set of off-line end effectors 30.

Optionally, the controller 72 is configured to control and/or communicate with a variety of other devices such as the environmental controller 56, heater 62, chiller 58, a vacuum source 94, and the like. As described herein, the environmental controller 56 is optionally provided to modulate the environment within the housing 52. In this regard, the environmental controller 56 is configured to receive signals from a sensor 96 and, based on these signals, control an air conditioning ("A/C") unit 98. The sensor 96 is configured to sense the environment within the housing 52 and generate a signal based on the environmental conditions. The A/C unit 98 is configured to direct a flow of conditioned air within the housing 52. The heater 62 is optionally provided to modulate the temperature of the course material 18. The chiller 58 is optionally provided to reduce the temperature of the cutting assembly 46, the set of clamps 90A to 90n, the path 40, and various other components such as, for example, restart rollers, and the like. The vacuum source 94 is optionally provided to supply vacuum to the vacuum nozzle 50.

The system 70, optionally, further includes a plurality of sensors configured to sense the various suitable operating conditions or attributes of the laminating device 10. Examples of suitable attributes include some or all of the temperature of the tow 36, the temperature at the location where the separator film 22 is separated from the tow 36 (release point), feed rate and direction, material placement, backing integrity, supply of tow 36, and/or the like.

Figure 4:
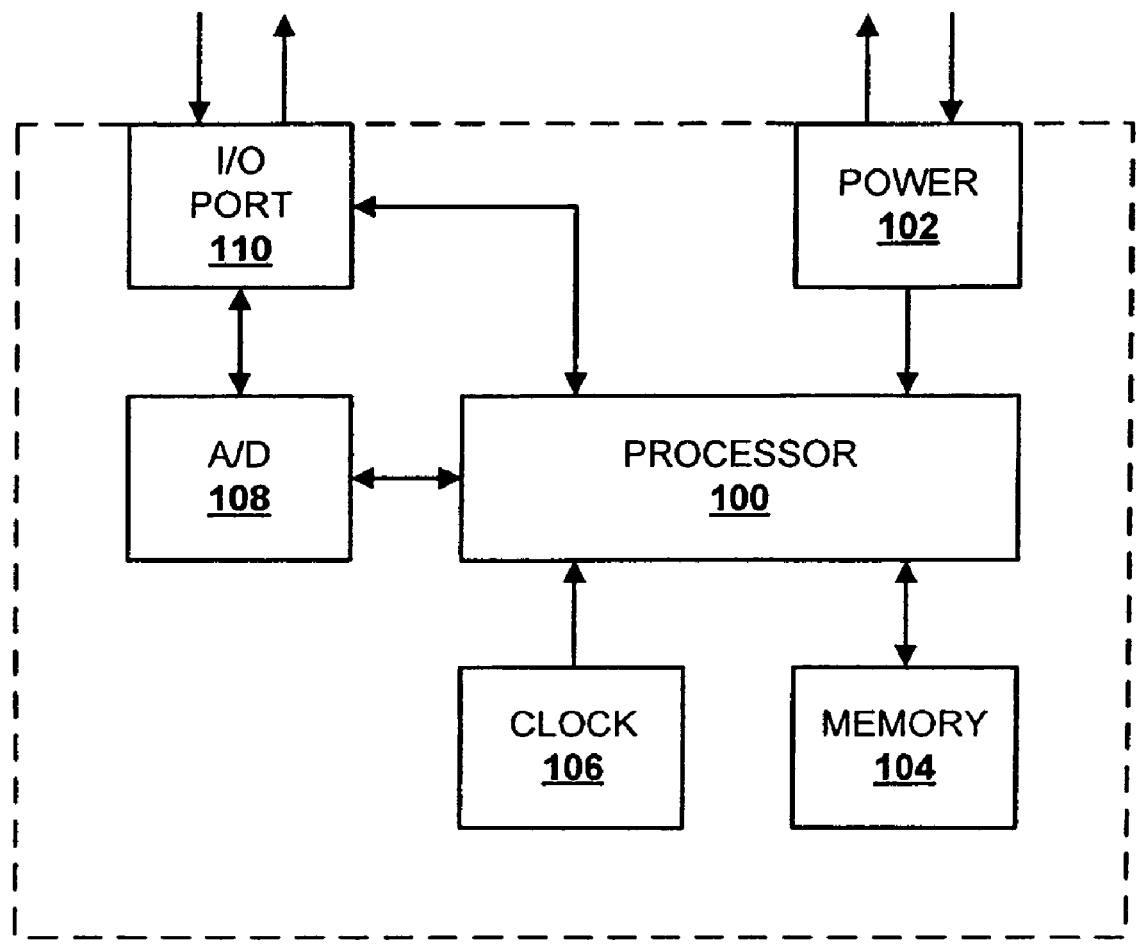
FIG. 4 is a system architecture for a controller suitable for use in the laminating device of FIG. 1.

FIG. 4 is a system architecture for the controller 72 suitable for use in the system 70. As shown in FIG. 4, the controller 72 includes a processor 100. This processor 100 is operably connected to a power supply 102, memory 104, clock 106, analog to digital converter (A/D) 108, and an input/output (I/O) port 110. The I/O port 110 is configured to receive signals from any suitably attached electronic device and forward these signals to the A/D 108 and/or the processor 100. If the signals are in analog format, the signals may proceed via the A/D 108. In this regard, the A/D 108 is configured to receive analog format signals and convert these signals into corresponding digital format signals. Conversely, the A/D 108 is configured to receive digital format signals from the processor 100, convert these signals to analog format, and forward the analog signals to the I/O port 110. In this manner, electronic devices configured to receive analog signals may intercommunicate with the processor 100.

The processor 100 is configured to receive and transmit signals to and from the A/D 108 and/or the I/O port 110. The processor 100 is further configured to receive time signals from the clock 106. In addition, the processor 100 is configured to store and retrieve electronic data to and from the memory 104. Furthermore, the processor 100 is configured to determine signals operable to modulate the positioning device controller 86 and thereby control the various actuators and/or servo motors of the laminating device 10 to exert a particular force and/or rotate to a particular degree.

According to an embodiment of the invention, the processor 100 is configured to execute the code 74. Based on this set of instructions and signals from the various components of the laminating device 10, the processor 100 is configured to: determine a set of movement instructions; modulate the heater 62, chiller 58, cutting assembly 46, and the like.

Figure 5:
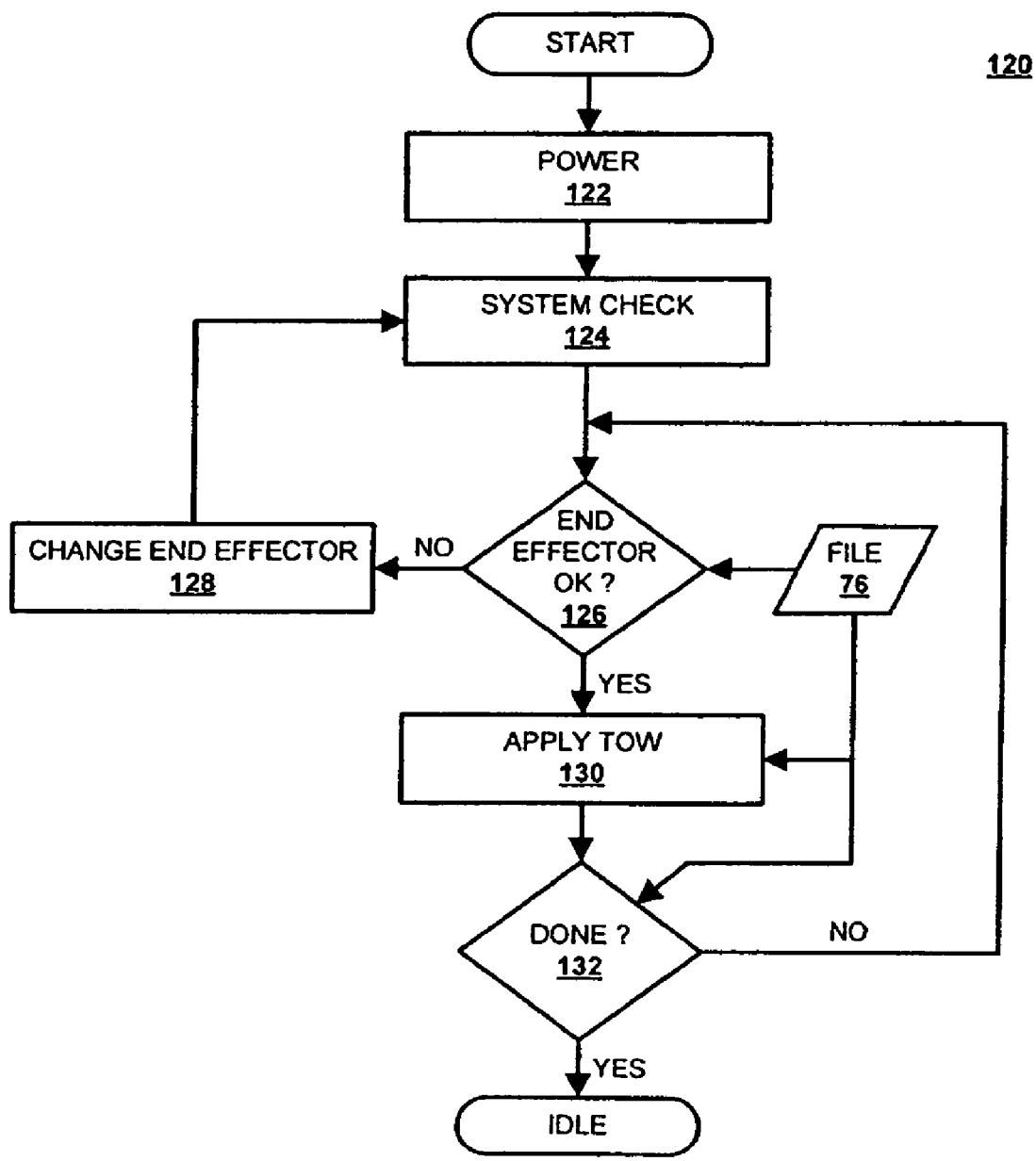
FIG. 5 illustrates steps involved in a method of placing tow to fabricate a composite item in accordance with the laminating device of FIG. 1.

FIG. 5 illustrates steps involved in a method 120 of placing the tow 36 to fabricate the composite item 16. Prior to the initiation of the method 120, a composite product is designed and, based on this design, a series of computer readable instructions specifying attributes of the composite product, such as the item 16, is generated. In addition, attributes or characteristics of the tow 36 are determined based upon characteristics of the item 16. For example, the item 16 may include layers or plies of different composite materials. More specifically, an aircraft fuselage may include a multitude of carbon fiber plies to provide structure, a wire mesh ply to protect against lightning, and a surfacing ply to provide a smooth surface. These different composite materials may be separately loaded on to each of the set of off-line end effectors 30 and, when appropriate, the respective off-line end effector 30 is selected and utilized to place the tow 36. These and other such parameters are included in the file 76 that contains the computer readable instruction and is accessed to fabricate the item 16.

Furthermore, estimates for when one or more spool of the set of spools 34 will be depleted are optionally calculated and, if it is determined that a spool is likely to be depleted during fabrication of the item 16, the set of off-line end effectors 30 may be configured to include a replacement. In this manner, downtime due to spool replacement may be minimized or essentially eliminated. Moreover, the set of off-line end effectors 30 may be configured to include one or more spares to be utilized in the event of a malfunction. In this manner, downtime due to spool replacement may be further minimized or essentially eliminated.

In addition, a form or tool such as the form 20 is designed and constructed based upon the design of the composite product. Furthermore, the spools 34 are installed in the end effector 14 and the tow 36 is threaded through the end effector 14.

At step 122, the method 120 is initiated by powering or turning on the various components of the laminating device 10 described herein above and executing the computer readable instructions in the file 76.

At step 124, the system is checked to insure proper operation. For example, the controller 72 queries each of the components and, based on responses from the components, the controller 72 determines the operational status. The controller 72 may further determine the type of composite material loaded on the end effector 14 and the supply of tow on each of the set of spools 32.

At step 126 it is determined if the end effector 14 is appropriate and in working order. For example, the controller 72 accesses the file 76 to determine if the composite material loaded in the end effector 14 is appropriate. If it is determined that the composite material is not appropriate, the end effector 14 is exchanged at step 128 with the appropriate off-line end effector 30. If it is determined that the composite material is appropriate, the tow 36 is applied at step 130.

At step 128 the end effector 14 is exchanged at step 128 with the appropriate off-line end effector 30. For example, the positioning device 12 positions the end effector 14 upon the off-line station 28 and controller 72 controls the release 92 to disengage. The positioning device is further controlled to select and couple with an appropriate off-line end effector 30 and the controller 72 controls the release 92 to engage. With regard to selecting the appropriate end effector, in various embodiments, end effectors with particular types of tow may have predefined positions on the off-line station 28 and/or the end effector may be configured to determine the type of tow loaded therein and may further be configured to determine its relative position upon the off-line station 28. This information is forwarded to the controller 72 and utilized to select the appropriate end effector from the set of off-line end effectors 30. In this manner, the end effector 14 is quickly and automatically exchanged thereby reducing or eliminating downtime due to at least changes in tow material, re-supply and threading of tow material, and malfunction of the end effector 14. Following the step 128, a system check of the newly installed end effector 14 is performed at step 124.

At step 130 the tow 36 is applied to the form 20. More particularly, according to the file 76, the controller 72 modulates the lamination device 10 to apply the tow 36 to the substrate 26. For example, a start location, path, and end location for a course is retrieved from the file 76 and the controller 72 modulates the various components of the laminating device 10 to tack the tow 36 to the start location, draw out and compact the tow 36 along the path, and cut the tow 36 at the end location.

At step 132 it is determined whether the layup for the item 16 is complete. For example, if the controller 72 determines an end of file ("EOF") statement has been retrieved from the file 76, it is determined the layup of the item 16 is complete and the laminator 10 is controlled to idle until further instructions are received. If it is determined that further layup protocols are present in the file 76, it may be further determined, at step 126, if the end effector 14 is operational and supplied appropriately with the tow 36.

Following the method 120, the item 16 or composite product may be cured in any suitable manner. In the aerospace industry, thermoset resins are generally utilized to pre-impregnate ply material. These thermoset resins are typically cured at an elevated temperature and pressure for a predetermined amount of time. Times, pressures, and temperatures may be selected depending on the resin used, the size and thickness of the composite product, and the like.

Although an example of the end effector 14 is shown being controlled by the positioning device 12, it will be appreciated that other control systems can be used. In this regard, a gantry system, guided vehicle, or other such positioning devices that support and control the movement of any suitable end effector are suitable for use with end effector 14. Also, although the laminating device 10 is useful to place plies for composite products in the airline industry it can also be used in other industries that construct composite product. These industries include, but are not limited to, automobile, marine, spacecraft, building, and consumer products.

The many features and advantages of the invention are apparent from the detailed specification, and thus, it is intended by the appended claims to cover all such features and advantages of the invention that fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A device to fabricate a composite item, the device comprising:
   a modular end effector to place tows, the end effector comprising:
      an integrated creel constructed and arranged to store a supply of a tow, wherein the creel includes an assembly of spindles adapted to detachably secure spools of the tow, wherein a longitudinal axis extends along a centerline of said integrated creel and said assembly of spindles are arranged such that a longitudinal axis of said assembly of spindles is substantially parallel to the longitudinal axis of said integrated creel; and
      a compaction device adapted to receive delivery of the tow from the spools, wherein said compaction device is configured to move along the longitudinal axis of said integrated creel to apply the tow to a form, and wherein said assembly of spindles are disposed circumferentially about said compaction device and about the longitudinal axis of said integrated creel; and
   a positioning device to position the end effector, wherein the end effector is detachably secured to the positioning device.

2. The device according to claim 1, further comprising:
   a release being electronically controllable to secure and detach the end effector and the positioning device.

3. The device according to claim 1, further comprising:
   a plurality of interchangeable end effectors, wherein the positioning device is configured to detachably secure ones of the plurality of interchangeable end effectors.

4. The device according to claim 3, wherein the positioning device is configured to replace one of the plurality of interchangeable end effectors with another of the plurality of interchangeable end effectors in about 20 seconds.

5. The device according to claim 1, wherein the end effector is configured to dispense one or more of fiber, foil, pre-cut pieces of pre-preg, fabric, slit tape, tape, adhesive film, and surfacer film.

6. The device according to claim 1, wherein the end effector further comprises:
   a redirecting pulley;
   a clamp to substantially stop movement of the tow;
   a cutting assembly to cut the tow; and
   a restart roller to feed the tow toward the compaction device.

7. The device according to claim 1, wherein the compaction device includes a roller to press the tow upon a substrate.

8. The device according to claim 1, wherein at least one spindle of said spindle assembly is a tensioning device.

9. The device according to claim 1, wherein said modular end effector further comprises an environmental controller for controlling a temperature of the tow.

10. The device according to claim 1, wherein the modular end effector is operable to be interchanged with another modular end effector via a controllable quick release coupling.

11. The device according to claim 1, wherein the modular end effector includes at least one of a housing, an environmental control assembly, a heater, and a chiller.

12. The device according to claim 1, wherein the modular head further includes a backing removal system to remove a backing from the material.

13. The device according to claim 1, wherein said compaction device is slidably coupled to said integrated creel.

14. The device according to claim 13, wherein said compaction device is slidable within a range of −1 to −20 mm.

15. The device according to claim 13, wherein said compaction device is slidable within a range of +1 to +20 mm.

16. A system to fabricate a composite item, the system comprising:
   a tool comprising:
      a mandrel to apply a tow upon; and
      a headstock to rotate the mandrel about an axis;
   a modular end effector to place the tow, the end effector comprising:
      an integrated creel constructed and arranged to store a supply of a tow, wherein the creel includes an assembly of spindles adapted to detachably secure spools of the tow, wherein a longitudinal axis extends along a centerline of said integrated creel and said assembly of spindles are arranged such that a longitudinal axis of said assembly of spindles is substantially parallel to the longitudinal axis of said integrated creel; and
      a compaction device adapted to receive delivery of the tow from the spools, said compaction device being configured to move along the longitudinal axis of said integrated creel to press the tow upon the mandrel, and wherein said assembly of spindles are disposed circumferentially about said compaction device and about the longitudinal axis of said integrated creel; and
   a positioning device operating cooperatively with the headstock to position the end effector relative to the tool, wherein the end effector is detachably secured to the positioning device.

17. The system according to claim 16, further comprising:
   a release being electronically controllable to secure and detach the end effector and the positioning device.

18. The system according to claim 16, further comprising:
   an off-line station; and
   a plurality of interchangeable end effectors disposed upon the off-line station, wherein the positioning device is configured to detachably secure ones of the plurality of interchangeable end effectors.

19. The system according to claim 18, wherein the positioning device is configured to replace one of the plurality of interchangeable end effectors with another of the plurality of interchangeable end effectors in about 20 seconds.

20. The system according to claim 16, wherein the end effector is configured to dispense one or more of fiber, foil, pre-cut pieces of pre-preg, fabric, slit tape, tape, adhesive film, and surfacer film.

21. The system of claim 16, further comprising,
   a vacuum source; and
   a vacuum nozzle fluidly connected to the vacuum source and the vacuum nozzle being configured to remove a backing from the tow.

22. The system of claim 16 further comprising,
   a take-up spool configured to remove a backing from the tow.

* * * * *